S. Beers,
Turning Regular Forms.
N° 11,016.                              Patented June 6, 1854.

UNITED STATES PATENT OFFICE.

SMITH BEERS, OF NAUGATUCK, CONNECTICUT.

METHOD OF TURNING HUBS, &c.

Specification of Letters Patent No. 11,016, dated June 6, 1854.

*To all whom it may concern:*

Be it known that I, SMITH BEERS, of Naugatuck, in the county of New Haven and State of Connecticut, have invented a new and useful Improvement in Machinery for Turning Wagon-Hubs and other Similar Articles in Wood or other Material; and I do hereby declare that the following is a full, clear, and exact description of the same, reference being had to the accompanying drawings, forming part of this specification, in which—

Figure 1:
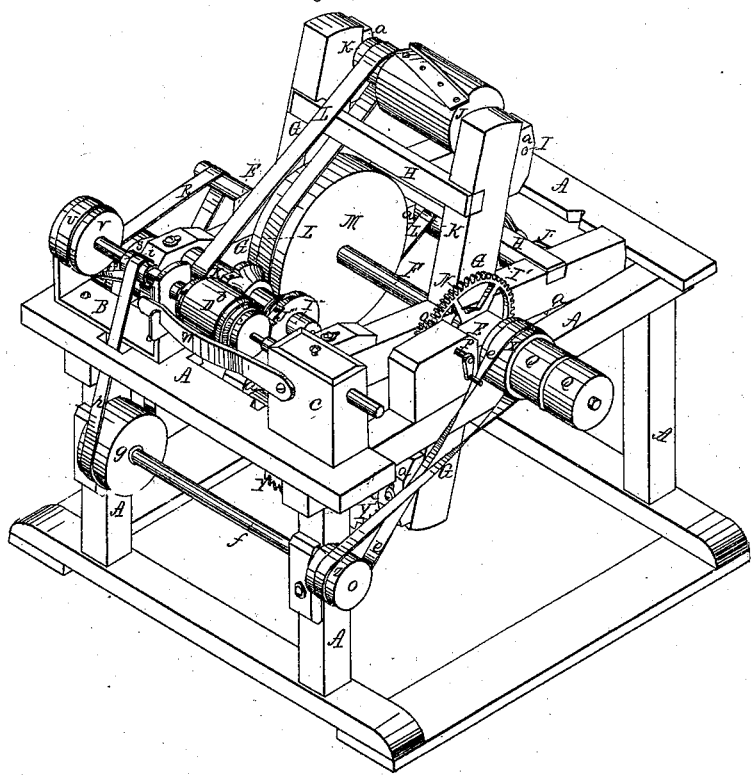
Figure 2:
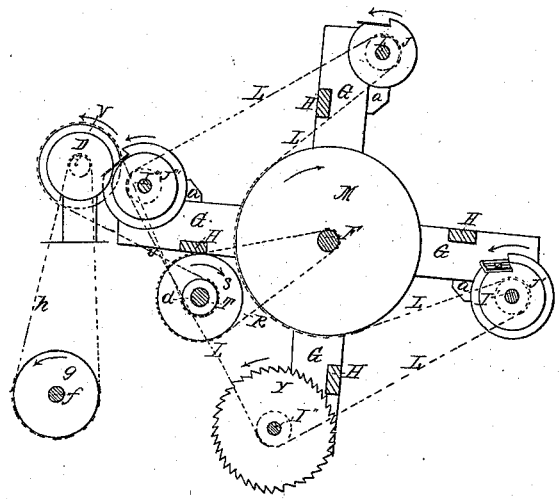

Figure 1, is a perspective view of a machine constructed according to my invention, and having cutters adapted to the turning of hubs. Fig. 2, is a transverse sectional elevation of the working parts of the same.

Similar letters of reference indicate corresponding parts in both figures.

The machinery which forms the subject of this invention, is for turning articles, the outline of whose longitudinal section is of regular, or irregular form. The cutting is produced by the simultaneous revolutions in contact with each other, of the cutters and the material to be operated upon.

The nature of my invention consists in submitting the material to the action of several sets of revolving cutters in succession, while the material revolves slowly; such sets of cutters being severally for the purpose of producing distinct parts of the form required; or some being for the purpose of preparing the material for the operation of the others which finish it, and all of the said cutters being hung in a revolving frame, or the equivalent thereof, which admits of their being brought successively into proper positions, in relation to the material for the cutting operations.

To enable those skilled in the art to make and use my invention, I will proceed to describe its construction and operation.

A, Fig. 1, is the framing which supports all the moving parts of the machine. At one end of this framing, are secured a mandrel head, B, and puppet head, C, which are similar to the heads of an ordinary lathe, and carry the centers between which the wood, or other material, D, to be turned, is held. On the top of the framing, near the center, are the boxes, E, E, which form the bearings for the main shaft, F, which is parallel, or nearly so, with the axis of the lathe heads.

On the main shaft, F, between the sides of the framing, A, A, the revolving frame, G, G, is hung loosely, so as to turn freely, when desired. This frame consists of two heads, G, G, each in the form of a cross, or with four arms radiating at right angles to each other, but may have any other number of arms, if desired. These heads are arranged with their arms opposite each other, and firmly connected by cross ties, H, H. One of the heads, G, G, has a toothed wheel, N, firmly secured to its outer side, and this wheel gears with a pinion, O, on a small shaft, P, which rests in suitable bearings on the side of the frame, A, A, and is furnished with a small crank, or other means of turning it, for the purpose of turning the frame, G, G, on the shaft, F. Each opposite pair of arms carry two boxes, a, a, which form the bearings of one of the cutter shafts, I, I′, I″, I‴, which carry the several cutter heads and sets of cutters. These cutters will vary in form with the nature of the work, but in the present case, the shaft, I, carries a cutter head, J, and set of cutters for turning down the parallel part, b, of the hub; the shaft, I′, carries a cutter head, J′, and a set of cutters for roughing out the parts, c, c, near the ends of the hub; the shaft, I″, carries a pair of circular saws, Y, Y′, set at a proper distance apart, to cut off the ends of the hub, and make it of proper length; and the shaft, I‴, carries a cutter head, J‴, and set of cutters for finishing off the parts, c, c.

The form of the cutters do not require to be particularly shown, as it will be understood they must correspond with the longitudinal outline required. All the boxes, a, a, are adjustable to move the cutter shafts toward, or from the main shaft. The several cutter shafts are parallel, or nearly so, with the main shaft, and are each furnished with a belt pulley, K, which receives a belt, L, running over a pulley, M, which is fast on the main shaft, F. The direction of this belt is shown in Fig. 2, where the belt is represented by a red line, and it must be such as will cause all the cutters to revolve in the same direction, as indicated by arrows in that figure.

The main shaft, F, receives rotary motion from any prime mover through a belt running over a fast pulley, Q, at one end, and at the same time that it communicates motion to the cutter shafts, as before described, communicates it also to the lathe mandrel by means of a belt, R, which runs from its back end over a pulley, S, which runs loosely on a short arbor, $d$, secured in the framing, A, A, and has a smaller pulley, T, attached to it, which smaller pulley gives motion to a belt, U, which runs over a pulley, V, on the mandrel. This arrangement of pulleys and belting, causes the cutters to receive a very rapid, and the material operated upon, a comparatively slow, rotary motion.

The operation of the machine is conducted in the following manner: After setting the cutter shafts severally at the proper distance from the main shaft, F, and adjusting the material, so that the cutters will reduce it to the required size, the attendant, by means of the crank on the shaft, P, brings the revolving frame, G, G, to such a position, that, the cutter head, J, is nearly opposite the lathe heads. He then places the material between the centers, and sets the cutter shafts and the material, D, in motion; after which, by means of the crank on the shaft, P, he moves the revolving frame, G, G, around the shaft, F, until the cutters on the head, J, come in contact with the material, D, and draws the cutter head in such a position, that when the material is properly reduced, it will pass it. He then moves the revolving frame, G, G, as quickly as convenient, to bring the cutters on the next cutter head, J', into operation on the material in a similar manner; and after these cutters pass it, again moves the revolving frame to bring the saws, Y, Y', in operation; and finally, after the saws pass it, moves the revolving frame to bring the finishing cutters on the cutter head, J''', into operation to finish off the parts, $c, c$. The hub, or other article is then finished, unless it requires any part to be further finished up by a hand tool. Finishing by hand can be performed in front of the lathe heads, where there is a hand rest, W; but, for this operation, the speed of the revolution of the mandrel has to be increased, and in order to effect this, the driving belt is shifted from the fast pulley, Q, to a loose pulley, Q', close beside it. This loose pulley has another pulley, X, secured to it, from which a belt, $e$, runs to a pulley, Z, on a shaft, $f$, which works in bearings in front of the framing, A, A, below the mandrel head. This shaft, $f$, carries another pulley, $g$, from which, a belt, $h$, runs to a pulley, $i$, on the mandrel. During the time the mandrel rotates at this increased speed, the belt, U, should be thrown off to stop the revolution of the cutter shafts, which would then acquire an undue velocity.

This machine possesses many advantages over those machines in which the form is produced by one set of cutters; of which may be mentioned, 1st, preserving the edges of the cutters, and making a much cleaner cut, as the roughing out and finishing of all parts where a deep cut is required, is made by separate cutters; 2d, enabling the cutters which are necessary to produce the required form to be arranged with greater simplicity; 3d, enabling a greater variety of forms to be produced.

I will here observe that the shafts of the revolving cutters may be placed in bearings on a straight platform having a suitable reciprocating rectilinear motion, to bring the cuters successively into contact, and though not as convenient an arrangement as that represented in the accompanying drawings and described, it would be mechanically equivalent.

I claim—

The arrangement and the manner of operating a series of revolving cutters for the purpose and in any manner substantially the same as hereinbefore set forth.

SMITH BEERS.

Witnesses:
O. D. MUNN,
JNO. W. HAMILTON.